(12) United States Patent
Matsuki et al.

(10) Patent No.: US 9,000,632 B2
(45) Date of Patent: Apr. 7, 2015

(54) ELECTRIC MOTOR FOR CONSTRUCTION MACHINERY, AND COOLING CIRCUIT FOR ELECTRIC MOTOR

(75) Inventors: Yasuhiko Matsuki, Fujisawa (JP); Masanori Minagawa, Tokyo (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 240 days.

(21) Appl. No.: 13/635,400

(22) PCT Filed: Jun. 6, 2011

(86) PCT No.: PCT/JP2011/062973
§ 371 (c)(1),
(2), (4) Date: Nov. 28, 2012

(87) PCT Pub. No.: WO2011/158685
PCT Pub. Date: Dec. 22, 2011

(65) Prior Publication Data
US 2013/0069456 A1    Mar. 21, 2013

(30) Foreign Application Priority Data
Jun. 18, 2010   (JP) ................................ 2010-139391

(51) Int. Cl.
*H02K 9/00* (2006.01)
*H02K 1/32* (2006.01)
*H02K 5/20* (2006.01)
*H02K 9/19* (2006.01)
*H02K 9/26* (2006.01)

(52) U.S. Cl.
CPC .. *H02K 9/26* (2013.01); *H02K 1/32* (2013.01); *H02K 5/20* (2013.01); *H02K 9/19* (2013.01)

(58) Field of Classification Search
CPC ............ H02K 9/06; H02K 1/20; H02K 9/19; H02K 1/32
USPC ........................ 310/52, 54, 58, 59, 64, 53, 61
See application file for complete search history.

(56) References Cited

U.S. PATENT DOCUMENTS 5,019,733 A * 5/1991 Kano et al. ...................... 310/61
7,802,614 B2 * 9/2010 Elnar .............................. 165/46
(Continued)

FOREIGN PATENT DOCUMENTS

| CN | 1817705 A | 8/2006 |
| JP | H02-094462 U | 7/1990 |

(Continued)

OTHER PUBLICATIONS

Office Action dated Jun. 5, 2014 from corresponding Chinese Patent Application No. 201180015201.3, including translation, 12 pages.
(Continued)

*Primary Examiner* — Hanh Nguyen
(74) *Attorney, Agent, or Firm* — Fish & Richardson P.C.

(57) ABSTRACT

A cooling circuit for an electric motor for a construction machine includes a circulation line that includes a shaft-side line disposed in a rotor shaft of the electric motor, a pump that supplies cooling fluid to the circulation line, a first filter disposed between the pump and the shaft-side line in the circulation line, a first bypass line that bypasses the first filter so as to connect an upstream side and a downstream side of the first filter, and a first relief valve disposed in the first bypass line.

10 Claims, 7 Drawing Sheets

(56) References Cited

U.S. PATENT DOCUMENTS

| | | | |
|---|---|---|---|
| 7,834,492 B2 * | 11/2010 | Iund et al. | 310/52 |
| 7,839,031 B2 * | 11/2010 | Tilton et al. | 310/54 |
| 8,749,102 B2 * | 6/2014 | Kozaka et al. | 310/61 |
| 2003/0030333 A1 * | 2/2003 | Johnsen | 310/54 |
| 2004/0149462 A1 | 8/2004 | Okamoto et al. | |

FOREIGN PATENT DOCUMENTS

| | | |
|---|---|---|
| JP | H06-021366 U | 3/1994 |
| JP | H08-200277 A | 8/1996 |
| JP | H11-041861 A | 2/1999 |
| JP | 2002-307962 A | 10/2002 |
| JP | 2006-019604 A | 1/2006 |
| JP | 2007-020337 A | 1/2007 |
| JP | 2008-281166 A | 11/2008 |

OTHER PUBLICATIONS

International Search Report mailed Aug. 9, 2011 in International Application No. PCT/JP2011/062973, 4 pages.

Office Action issued Aug. 23, 2013 in corresponding Korean Application No. 10-2012-7024036, including English translation, 8 pages.

* cited by examiner

ABSTRACT# ELECTRIC MOTOR FOR CONSTRUCTION MACHINERY, AND COOLING CIRCUIT FOR ELECTRIC MOTOR

CROSS REFERENCE TO RELATED APPLICATIONS

This application claims priority to Application No. PCT/JP2011/062973 filed on Jun. 6, 2011, which application claims priority to Japanese Application No. 2010-139391, filed on Jun. 18, 2010. The entire contents of the above applications are incorporated herein by reference in their entireties.

TECHNICAL FIELD

The present invention relates to an electric motor for a construction machine and a cooling circuit for an electric motor.

BACKGROUND ART

There have been construction machines that use a cooling circuit which cools an electric motor thereof with the use of cooling fluid (see, for example, Patent Literature 1). In such a cooling circuit, cooling fluid is supplied from a pump to an electric motor. Then, the cooling fluid circulates in the electric motor so as to cool the electric motor. After cooling the electric motor, the cooling fluid flows out of the electric motor, and is cooled by a heat exchanger such as a radiator. Then, the cooling fluid is supplied again to the electric motor.

Generally, for cooling an electric motor for a construction machine, cooling fluid that has been filtered by a filter is circulated within the electric motor. Since foreign objects are removed from the cooling fluid by the filter, entry of the foreign objects into the electric motor is prevented.

CITATION LIST(S)

Patent Literature

Patent Literature 1 JP-A-2007-20337

SUMMARY OF THE INVENTION

Problem(s) to be Solved by the Invention

Since a typical electric motor are not so much highly resistant against heat, failure to cool the electric motor affects the electric motor more significantly than failure to remove foreign objects from the cooling fluid with the use of a filter. In particular, since construction machines use an electric motor for driving heavy objects, such as an upper rotary body and work equipment, a high load is imposed on the electric motor, which often results in increased heat generation of the electric motor. Therefore, it is important for the construction machines to cool the electric motor.

However, when the cooling fluid cannot pass through the filter due to some reason, such as clogging of the filter with foreign objects, the cooling fluid cannot be sent downstream of the filter and, consequently, the electric motor is not cooled. If a cooling operation using the cooling fluid is not performed, the electric motor might be damaged due to heat.

An object of the invention is to provide an electric motor for a construction machine in which a cooling operation can be reliably performed, and a cooling circuit for the electric motor.

Means for Solving the Problem(s)

According to an aspect of the present invention, there is provided a cooling circuit for an electric motor for a construction machine. The cooling circuit includes: a circulation line that includes a shaft-side line disposed in a rotor shaft of the electric motor; a pump that supplies cooling fluid to the circulation line; a first filter disposed between the pump and the shaft-side line in the circulation line; a first bypass line that bypasses the first filter so as to connect an upstream side and a downstream side of the first filter; and a first relief valve disposed in the first bypass line.

In the cooling circuit according to the above aspect of the invention, it is preferable that, in the electric motor, the circulation line include: a cooling fluid inlet port through which the cooling fluid is introduced; a port communication line that communicates with the cooling fluid inlet port; a filter line that accommodates the first filter and communicates with the port communication line; and a connection line that connects the filter line to the shaft-side line. It is also preferable that the cooling fluid inlet port, the port communication line, the filter line, the first filter, the first bypass line, and the first relief valve be disposed in the same plane in the electric motor.

In the cooling circuit according to the above aspect of the invention, it is preferable that the first filter be disposed upstream of the shaft-side line in the circulation line, and that a second filter having a greater capacity than the first filter be disposed downstream of the shaft-side line in the circulation line.

The cooling circuit according to the above aspect of the invention preferably further includes: a second bypass line that bypasses the second filter so as to connect an upstream side and a downstream side of the second filter; and a second relief valve disposed in the second bypass line.

According to another aspect of the present invention, there is provided an electric motor that rotates an upper rotary body of a construction machine. A rotor shaft of the electric motor is supported at opposite ends thereof by bearings, and the electric motor is mounted on the construction machine such that the rotor shaft extends vertically. A cooling circuit for cooling the electric motor is provided that includes: a cooling fluid inlet port through which the cooling fluid is introduced; a port communication line that communicates with the cooling fluid inlet port; a filter line that accommodates a filter and communicates with the port communication line, the filter being configured to filter the cooling fluid; a shaft-side line disposed in the rotor shaft; a connection line that is disposed directly above the rotor shaft and extends in an axial direction of the rotor shaft so as to connect the filter line to the shaft-side line; a bypass line that bypasses the filter so as to connect an upstream side and a downstream side of the filter; and a relief valve disposed in the bypass line. The cooling fluid inlet port, the port communication line, the filter line, the filter, the bypass line, and the relief valve are disposed in the same plane in the electric motor.

Advantageous Effects of the Invention

In the cooling circuit for an electric motor for a construction machine according to the above aspect of the invention, since the first bypass line that bypasses the first filter so as to connect the upstream side and the downstream side of the first filter and the first relief valve disposed in the first bypass line are provided, even when the first filter is clogged, the cooling fluid can flow within the electric motor by passing through the bypass line. Accordingly, the electric motor can be reliably cooled.

According to the above aspect of the invention, when, in the electric motor, the circulation line includes a cooling fluid inlet port through which the cooling fluid is introduced; a port communication line that communicates with the cooling fluid inlet port; a filter line that accommodates the first filter and communicates with the port communication line; and a connection line that connects the filter line to the shaft-side line, and where the cooling fluid inlet port, the port communication line, the filter line, the first filter, the first bypass line, and the first relief valve are disposed in the same plane in the electric motor, the number of machined holes for mounting the first filter and the first relief valve on the electric motor can be reduced. Further, a line for connecting the first filter to the first relief valve can be disposed in the same plane. This facilitates processing of the electric motor upon providing the cooling circuit.

According to the above aspect of the invention, when a second filter having a greater capacity than the first filter is disposed downstream of the shaft-side line in the circulation line, even if the cooling fluid bypasses the first filter and therefore foreign objects are not removed from the cooling fluid, the second filter having a greater capacity than the first filter can reliably remove the foreign objects from the cooling fluid.

According to the above aspect of the invention, when the cooling circuit includes a second bypass line that bypasses the second filter so as to connect an upstream side and a downstream side of the second filter, and a second relief valve disposed in the second bypass line, the cooling fluid can bypass both the first and second filters. Accordingly, even if both the filters are clogged, the cooling fluid can flow within the electric motor, and therefore the electric motor can be reliably cooled.

According to the above aspect of the invention, when a bearing-cooling line that is disposed separately from the shaft-side line in the circulation line and that is configured to cool a bearing of the rotor shaft, since the bearing-cooling line is disposed separately from the shaft-side line, a centrifugal force generated by rotation of the rotor is not applied to the cooling fluid in the bearing-cooling line. Accordingly, it is possible to prevent the flow rate of the cooling fluid sent to the bearing from varying in accordance with the rotational speed of the rotor, and thus to facilitate control of the flow rate of the cooling fluid to the bearing.

According to the above aspect of the invention, when the bearing-cooling line is disposed in the electric motor and branches from a location other than the shaft-side line, there is no need to separately provide a pump dedicated for cooling the bearing or a line connecting the branch position to the bearing-cooling line. Accordingly, the bearing can be cooled with a simple configuration.

According to the above aspect of the present invention, when the electric motor is mounted on the construction machine such that the rotor shaft extends vertically, and where the cooling fluid in the bearing-cooling line cools, after cooling the bearing, at least one of a rotor of the electric motor and a permanent magnet provided in the rotor before returning to the pump, it is possible to cause the cooling fluid in the bearing-cooling line to cool the rotor or the permanent magnet as well as the bearing. Further, it is possible to cause the cooling fluid to circulate again using the pump. Accordingly, cooling can be effectively performed, and the cooling fluid can be efficiently used.

In the electric motor for a construction machine according to the above aspect of the invention, since the bypass line that bypasses the filter so as to connect the upstream side and the downstream side of the filter and the relief valve disposed in the bypass line are provided, even when the filter is clogged, the cooling fluid can flow within the electric motor by passing through the bypass line. Accordingly, the electric motor can be reliably cooled.

DESCRIPTION OF EMBODIMENT(S)

An exemplary embodiment of the invention will be described below with reference to the drawings.

Figure 1:
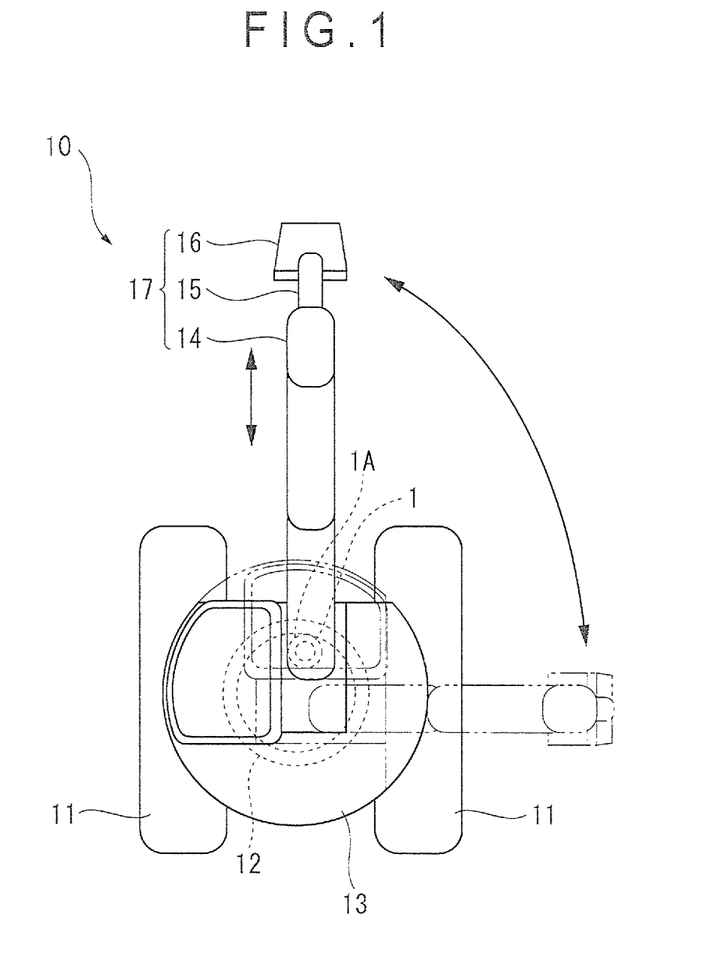
FIG. 1 is a plan view of a construction machine according to an exemplary embodiment of the invention.

FIG. 1 is a plan view of an electric rotary excavator 10 serving as a construction machine according to the present exemplary embodiment. This electric rotary excavator 10 includes a rotary body 13 that is disposed on a track frame of an undercarriage 11 with a swing circle (a driven gear) 12 interposed therebetween.

The rotary body 13 is rotated by a driving gear 1A of an electric motor 1 that meshes with the swing circle 12. For this reason, the electric motor 1 is arranged in a so-called vertical orientation such that a rotor 8 (see FIG. 5) for driving the driving gear 1A is vertically disposed. This electric motor 1 is cooled by a below-described cooling circuit 2 (see FIG. 2).

The rotary body 13 is provided with a boom 14, an arm 15, and a bucket 16, which are driven by respective hydraulic cylinders (not shown). The boom 14, arm 15 and bucket 16 form work equipment 17. The hydraulic cylinders are hydraulically driven by a hydraulic pump 21 (FIG. 2) which is driven by an engine 5 (FIG. 2) and serves as a hydraulic source. As described above, the electric rotary excavator 10 is a hybrid construction machine that is provided with the hydraulically-driven work equipment 17 and the electrically-driven rotary body 13.

Figure 2:
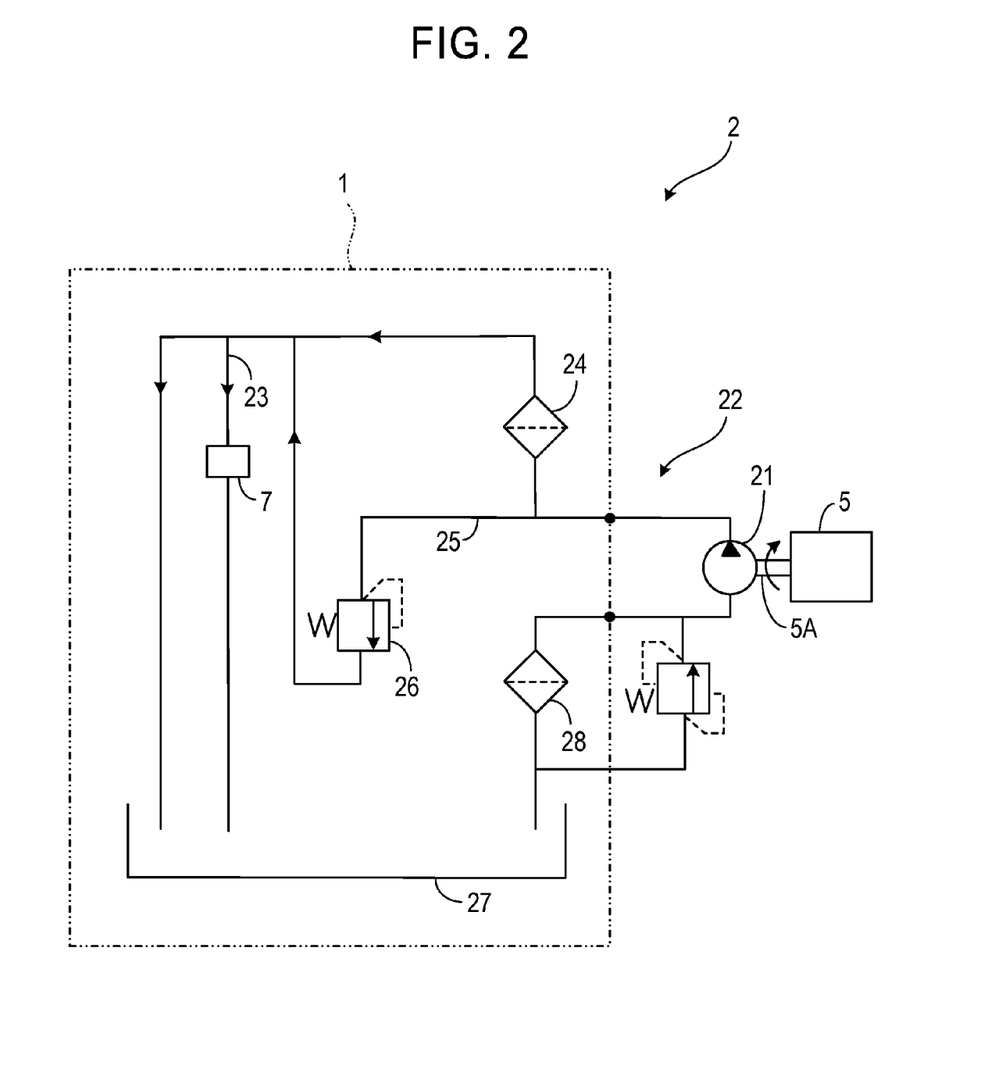
FIG. 2 is a schematic diagram of a cooling circuit for an electric motor mounted in the construction machine.

FIG. 2 is a schematic diagram of the cooling circuit 2. The cooling circuit 2 includes the hydraulic pump (a pump) 21 that supplies cooling oil serving as cooling fluid to the electric motor 1, a circulation line 22 that extends from the hydraulic pump 21, passes through the electric motor 1 and returns to the hydraulic pump 21, a bearing-cooling line 23 that is branched from the circulation line 22 so as to cool a bearing 7 disposed in the electric motor 1.

The hydraulic pump 21 and a generator motor (not shown) are serially connected to an output shaft 5A of the engine 5 such that both the generator motor and the hydraulic pump 21 are driven by the engine 5. Electric power generated by the generator motor is stored in an electric storage device (not shown) such as a capacitor, and is supplied to the electric motor 1 through an inverter (not shown) from the electric storage device when driving the electric motor 1.

An inlet-side filter (a first filter) 24 is provided at the upstream side of the circulation line 22, i.e., the outlet side of the hydraulic pump 21. A bypass line (a first bypass line) 25 that bypasses the inlet-side filter 24 so as to connect the upstream side and the downstream side of the inlet-side filter 24. A relief valve (a first relief vale) 26 is disposed in the bypass line 25. Accordingly, the cooling oil in the circulation line 22 can bypass the inlet-side filter 24 in accordance with the open/closed state of the relief valve 26.

The cooling oil having passed through the inlet-side filter 24 or the bypass line 25 is branched into below-described connection lines 635 and 641 (both shown in FIG. 5) and the bearing-cooling line 23. The cooling oil having flowed into the bearing-cooling line 23 cools the bearing 7 in the electric motor 1.

On the other hand, the cooling oil having passed through the circulation line 22 and cooled the electric motor 1 is collected in an oil reservoir 27 in the electric motor 1, and then flows toward the hydraulic pump 21. An outlet-side filter (a second filter) 28 is provided at the downstream side of the circulation line 22, i.e., the inlet side of the hydraulic pump 21. The cooling oil passes through the outlet-side filter 28 so as to be filtered, and is sent again to the electric motor 1 by the hydraulic pump 21.

The following describes the configuration of the electric motor 1 and the features of the cooling circuit 2.

The electric motor 1 of this exemplary embodiment is a rotary motor that drives an upper rotary body of an excavator, and has two cooling structures that use oil and water, respectively, as cooling media. More specifically, the electric motor 1 includes a cooling circuit that cools the electric motor 1 from the outer periphery thereof with the use of cooling water, and a cooling circuit 2 that cools components (e.g. a rotor 8), that are disposed inside the electric motor 1 with the use of cooling oil. It is to be noted that the cooling circuit that cools the electric motor 1 from the outer periphery thereof may use cooling oil.

Figure 3:
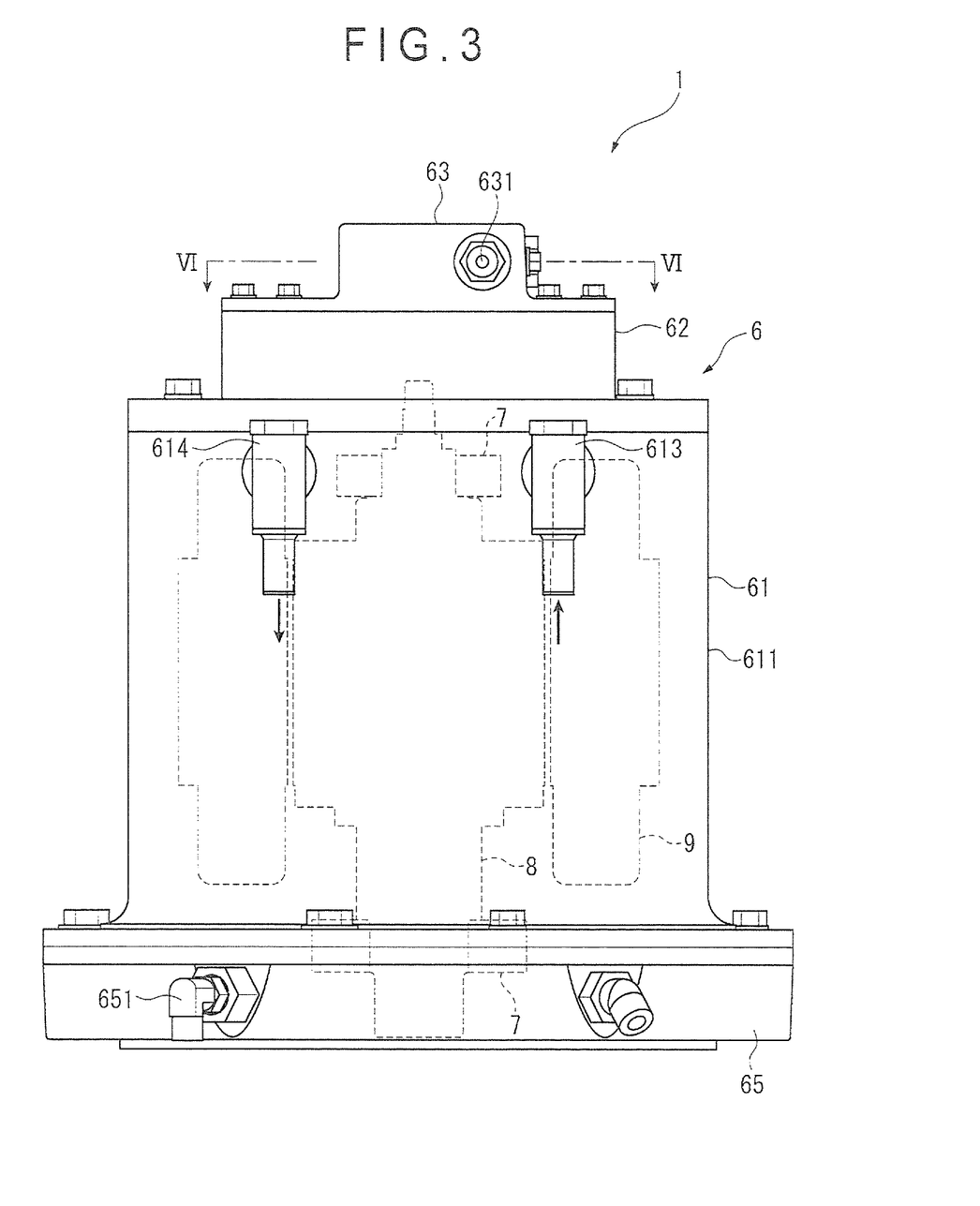
FIG. 3 is a side view of the electric motor.
Figure 4:
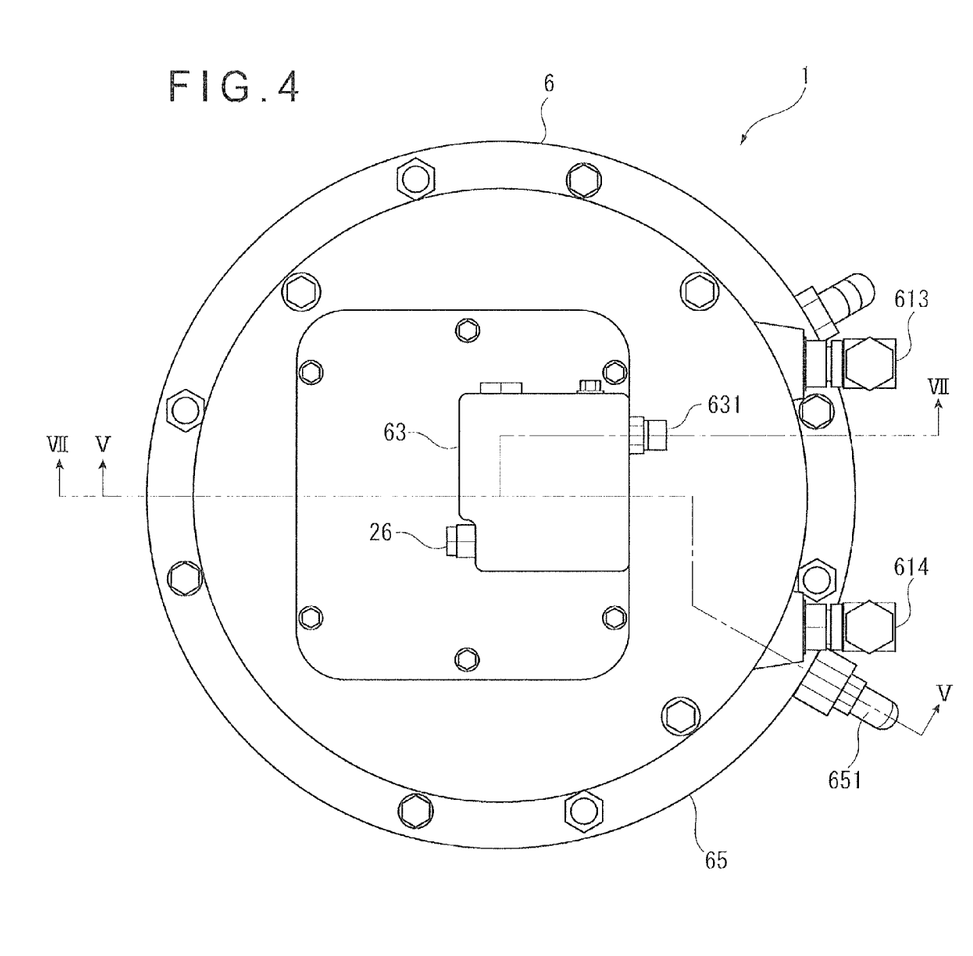
FIG. 4 is a plan view of the electric motor.
Figure 5:
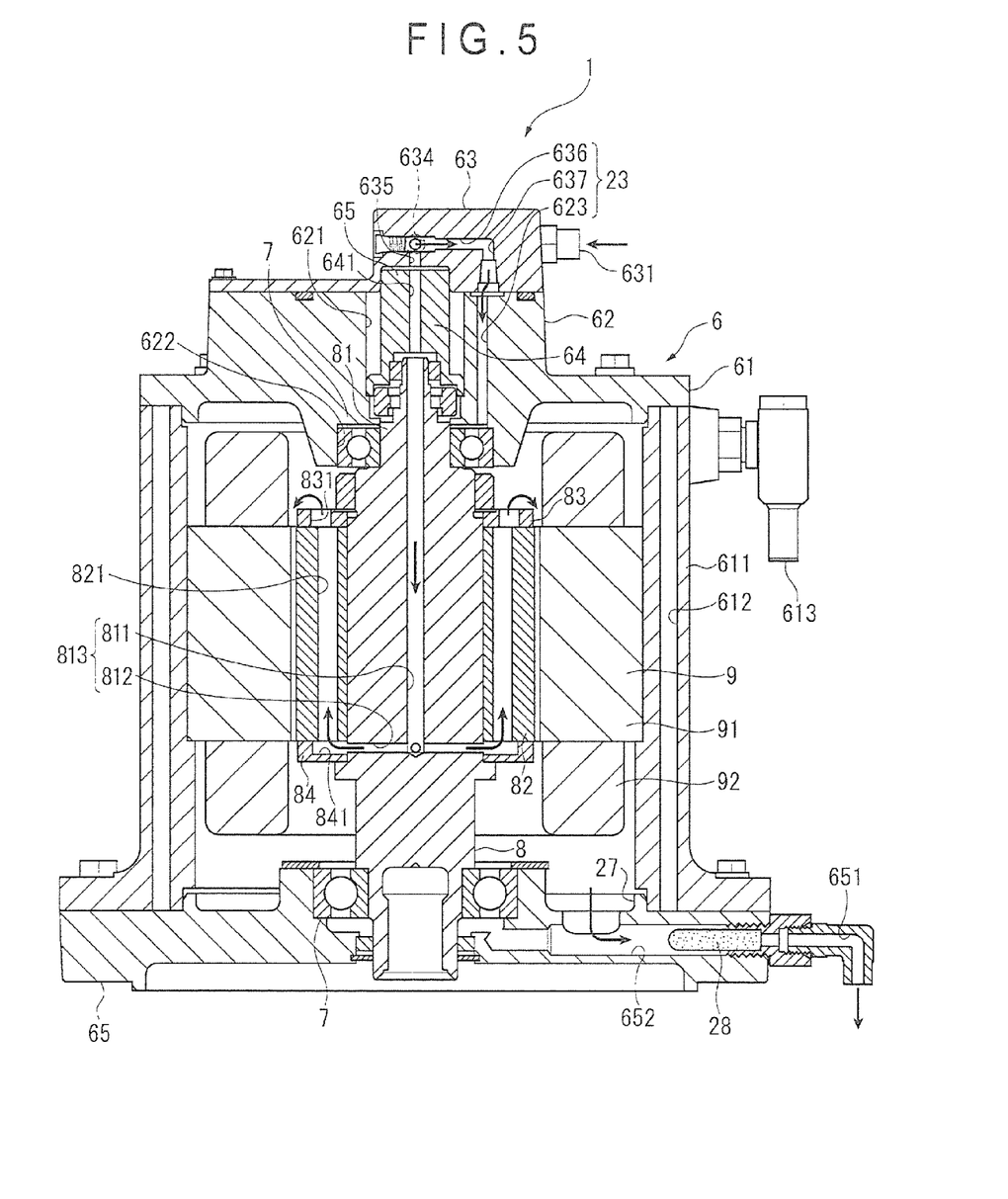
FIG. 5 is a vertical sectional view of the electric motor.

As illustrated in FIGS. 3 through 5, the electric motor 1 includes a housing 6 serving as an immovable member, the bearings 7 disposed in the housing 6, the rotor 8 rotatably supported by the housing 6 through the bearings 7, and a stator 9 that is disposed to cover the outer periphery of the rotor 8.

The housing 6 includes a cylindrical main body 61, a ceiling 62 that closes an open end of the main body 61, a cooling-fluid introduction part 63 disposed on the ceiling 62, a support member 64 that is disposed inside the ceiling 62 and is configured to support the distal end of a rotor shaft 81 (see FIG. 5) near the cooling-fluid introduction part 63, and a bottom 65 that closes the other open end of the main body 61.

As illustrated in FIG. 5, the main body 61 includes a water jacket 612 formed inside a side wall 611, a cooling-water inlet port 613 and a cooling-water outlet port 614 that communicate with each other through the water jacket 612. The cooling water flows from the cooling-water inlet port 613 into the electric motor 1, passes through the water jacket 612 so as to cool the housing 6, and flows out from the cooling-water outlet port 614. The side wall 611 is in contact with a below-described stator core 91, and is in indirect contact with the upper and lower bearings 7 through the ceiling 62 and the bottom 65, respectively, so that the stator core 91 and the bearings 7 are cooled by the cooling water in the water jacket 612.

As illustrated in FIG. 5, the ceiling 62 is provided with a through hole 621 extending from the main body 61 toward the cooling-fluid introduction part 63, a bearing fixing part 622 formed in the through hole 621 near the main body 61, the bearing 7 that is fixed to the bearing fixing part 622 and is configured to support the upper end side of the rotor shaft 81, and a bearing-direction line 623 extending from the cooling-fluid introduction part 63 side to the bearing 7. The support member 64 is disposed in the through hole 621. In the support member 64, a connection line 641 is formed along the axial direction of the rotor shaft 81. The connection line 641 communicates with an axial line 811 of the below-described rotor shaft 81.

Figure 6:
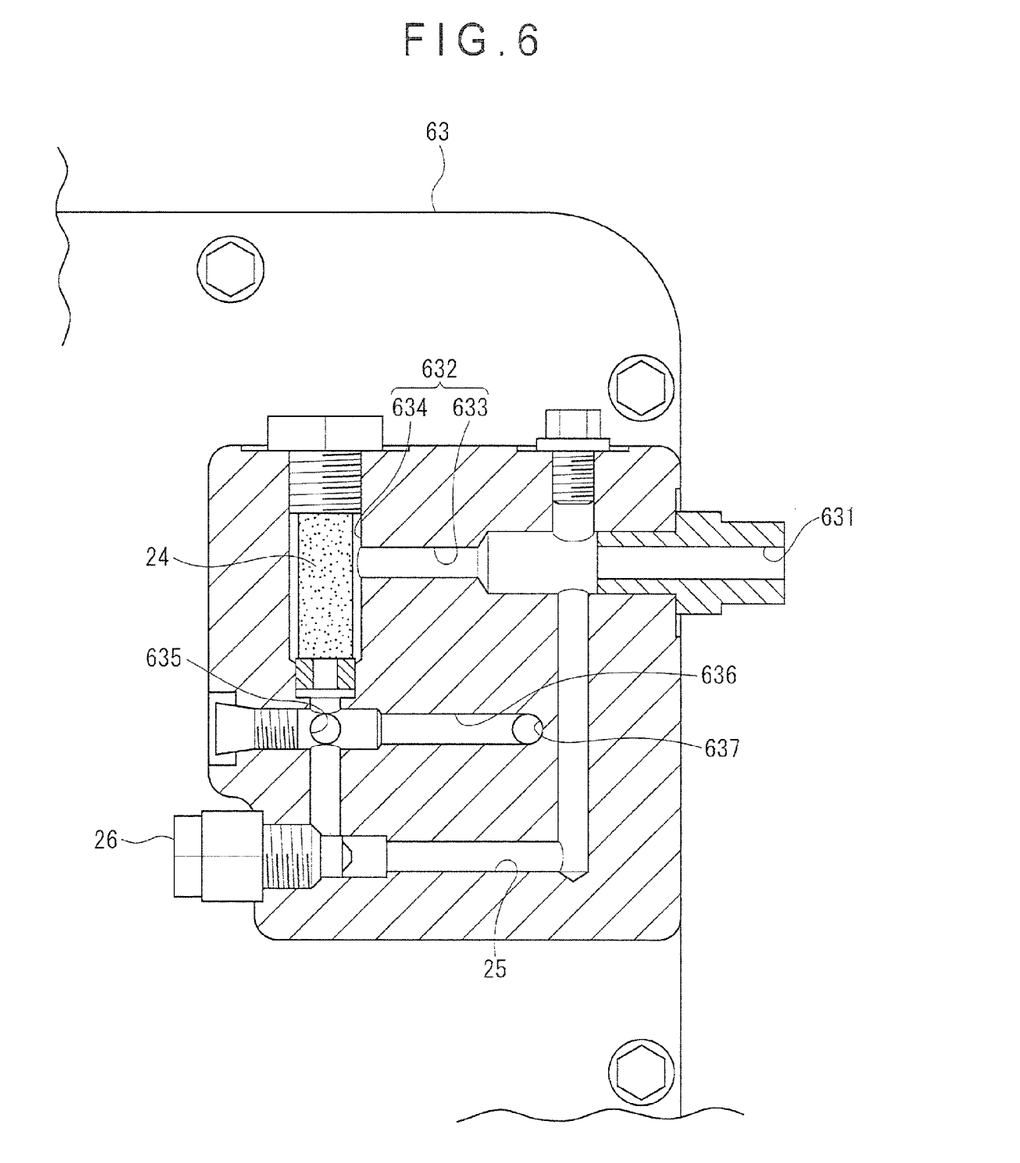
FIG. 6 is a horizontal sectional view of a ceiling of the electric motor.
Figure 7:
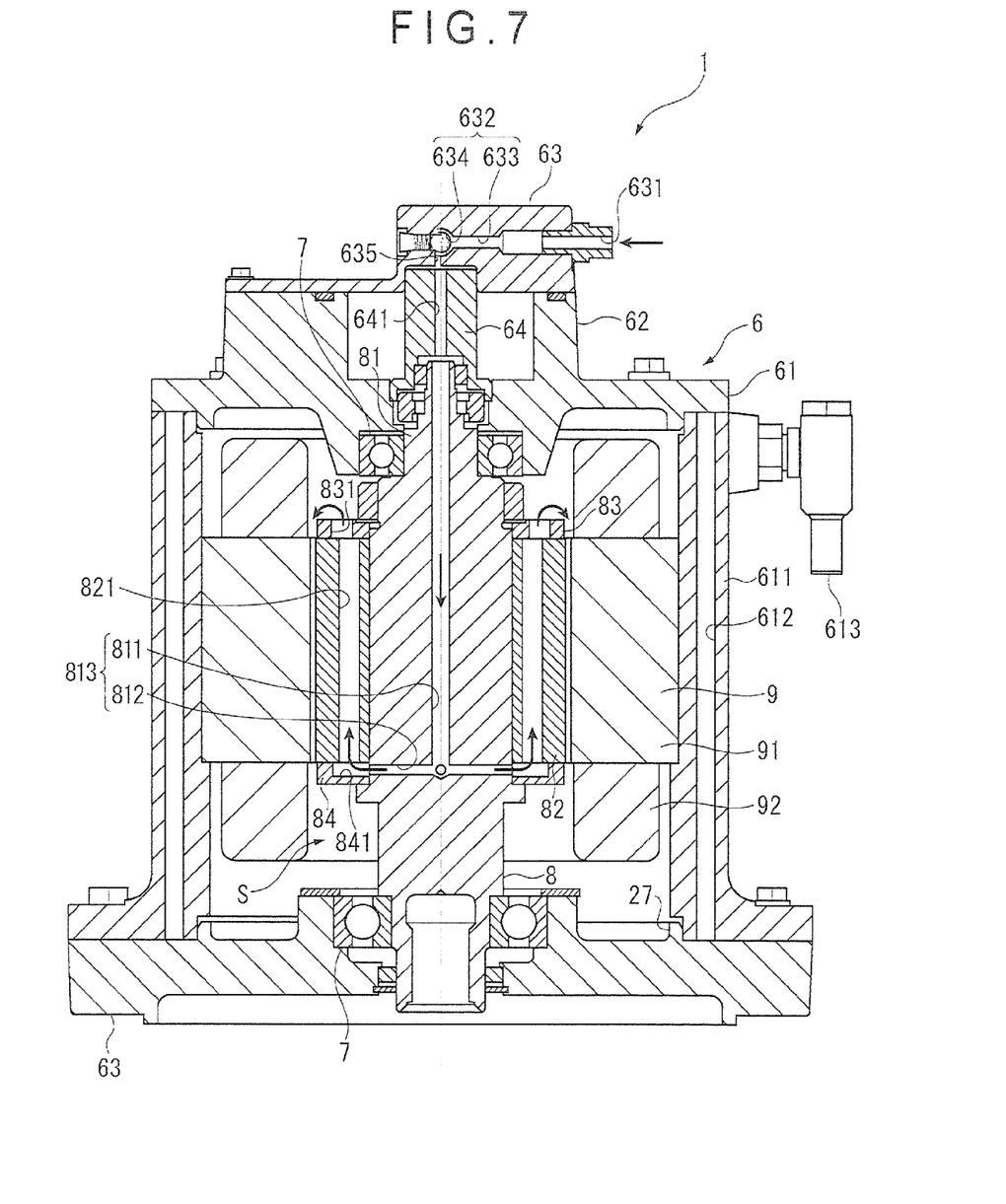
FIG. 7 is another vertical sectional view of the electric motor.

As illustrated in FIGS. 5 through 7, the cooling-fluid introduction part 63 is provided with a cooling-oil inlet port 631 (a cooling fluid inlet port), an introduction line 632 (see FIGS. 6 and 7) that communicates with the cooling-oil inlet port 631 so as to introduce the cooling oil into the electric motor 1, the bypass line 25 (see FIG. 6) that bypasses the inlet-side filter 24 so as to connect the upstream side and the downstream side of the inlet-side filter 24 disposed in the introduction line 632, the relief valve 26 (see FIG. 6) disposed in the bypass line 25, the connection line 635 that extends along the axial direction of the rotor shaft 81 from the introduction line 632, a branch line 636 (see FIGS. 6 and 7) that is disposed in the same plane as the introduction line 632 and is branched from the introduction line 632, and the bearing-direction line 637 (see FIGS. 5 and 6) that extends parallel to the rotation axis direction of the electric motor 1 so as to communicate with the branch line 636 and the bearing-direction line 623 of the ceiling 62.

The introduction line 632 includes a port communication line 633 communicating with the cooling-oil inlet port 631, and a filter line 634 accommodating the inlet-side filter 24 and communicating with the port communication line 633. The connection line 635 has an end communicating with the introduction line 632 and the bypass line 25, and the other end communicating with the connection line 641 of the support member 64. As shown in FIG. 5, the bearing-cooling line 23 described with reference to FIG. 2 includes the branch line 636, the bearing-direction line 623, and the bearing-direction line 637.

The cooling-oil inlet port 631, the inlet-side filter 24, and the relief valve 26 are provided on different side surfaces of the cooling-fluid introduction part 63. With this layout, these relatively large components of the cooling-fluid introduction part 63 are effectively arranged, which allows the size of the cooling-fluid introduction part 63 to be reduced.

Further, as illustrated in FIG. 6, the cooling-oil inlet port 631, the port communication line 633, the filter line 634, the branch line 636, the bypass line 25, and the relief valve 26 are all disposed in the same plane.

As illustrate in FIG. 5, the bottom 65 of the housing 6 is provided with the bearing 7 supporting the lower end of the rotor shaft 81, the oil reservoir 27 having an angular U-shaped cross section, a cooling-oil outlet port 651 for discharging the cooling oil to the outside, a cooling-oil outlet line 652 communicating between the oil reservoir 27 and the cooling-oil outlet port 651, and the outlet-side filter 28 disposed in the cooling-oil outlet line 652. The outlet-side filter 28 used in this exemplary embodiment has a greater capacity than that of the inlet-side filter 24.

The rotor 8 includes the rotor shaft 81, a rotor core 82, an upper plate 83, and a lower plate 84.

The rotor shaft 81 is rotatably supported at both ends thereof by the bearings 7. The rotor shaft 81 includes the axial line 811 that extends along the axial direction of the rotor shaft 81, and a plurality of radial lines 812 that radially extend from the axial line 811 so as to be open at the outer periphery of the rotor shaft 81. In the rotor shaft 81, the axial line 811 and the radial lines 812 form a shaft-side line 813.

The rotor core 82 is formed of axially stacked magnetic steel sheets. The rotor core 82 is fitted on the rotor shaft 81 so as to be rotated together with the rotor shaft 81. In this rotor core 82, a plurality of through channels 821 are formed along the axial direction thereof, and a plurality of permanent magnets (not shown) are embedded.

The upper and lower plates 83 and 84 are fitted on the rotor shaft 81 so as to hold the rotor core 82 therebetween. Thus, the upper and lower plates 83 and 84 are rotated together with the rotor shaft 81 and the rotor core 82. The upper plate 83 is provided with a cooling-oil ejection hole 831 communicating with the through channels 821 of the rotor core 82. The lower plate 84 is provided with a groove 841 having an angular-U shaped cross section so as to connect between the radial lines 812 of the rotor shaft 81 and the through channels 821 of the rotor core 82.

The stator 9 includes a stator core 91 and a stator coil 92.

Similar to the rotor core 82, the cylindrical stator core 91 is formed of axially stacked magnetic steel sheets. The stator core 91 includes a yoke (not shown) at an inner peripheral side thereof. The stator coil 92 is wound around the yoke.

In this electric motor 1, the circulation line 22 (see FIG. 2) includes the cooling-oil inlet port 631, the introduction line 632, the connection line 635, the branch line 636, and the bearing-direction line 637 that are provided in the cooling-fluid introduction part 63 of the housing 6; the connection line 641 provided in the support member 64 of the housing 6; the bearing-direction line 623 provided in the ceiling 62 of the housing 6; the axial line 811, the radial lines 812, the groove 841, the through channels 821, and the cooling-oil ejection hole 831 that are provided in the rotor 8; the space between the outer periphery of the rotor core 82 and the stator core 91; and the oil reservoir 27, the cooling-oil outlet line 652, and the cooling-oil outlet port 651 that are provided in the bottom 65 of the housing 6. Further, the cooling circuit 2 includes the hydraulic pump 21, the circulation line 22, the inlet-side filter 24, the outlet-side filter 28, the bypass line 25, and the relief valve 26.

In the cooling circuit 2 having the configuration described above, the cooling oil supplied from the hydraulic pump 21 flows from the cooling-oil inlet port 631 into the introduction line 632 of the electric motor 1. Usually, since the relief valve 26 of the bypass line 25 is closed, the cooling oil having flowed into the introduction line 632 passes through the inlet-side filter 24 so as to be filtered and is branched into the connection lines 635 and 641 and the bearing-cooling line 23. The cooling oil having flowed into the bearing-cooling line 23 flows to an outer ring portion of the bearing 7 so as to cool the bearing 7.

On the other hand, the cooling oil having flowed into the connection lines 635 and 641 flows into the axial line 811 of the rotor shaft 81. Having reached the lower end of the axial line 811, the cooling oil passes through the radial lines 812 of the rotor shaft 81, the groove 841 provided in the lower plate 84, and the through channels 821 of the rotor core 82 so as to cool the rotor 8. The cooling oil having passed through the through channels 821 is ejected from the cooling-oil ejection hole 831 into the main body 61, and flows down to the bottom 65 while cooling the stator coil 92.

When the cooling oil having flowed into the cooling-oil inlet port 631 cannot pass through the inlet-side filter 24 due to clogging of the inlet-side filter 24 and the like, the pressure at the upstream side of the inlet-side filter 24 is increased due to the cooling oil supplied from the hydraulic pump 21. When this pressure exceeds a setting pressure (a preset valve opening pressure) of the relief valve 26, the relief valve 26 is opened. Thus, the cooling oil passes through the bypass line 25, and flows into the axial line 811 of the rotor 8 and the bearing-cooling line 23 of the housing 6 so as to cool the electric motor 1.

The cooling oil having reached the oil reservoir 27 of the bottom 65 flows from the oil reservoir 27 into the cooling-oil outlet line 652. Then, the cooling oil is filtered by the outlet-side filter 28 and flows out of the cooling-oil outlet port 651. After having flowed out of the cooling-oil outlet port 651 is cooled by the heat exchanger (not shown), the cooling oil is sent to the hydraulic pump 21 to be sent again to the electric motor 1 by the hydraulic pump 21.

According to the above exemplary embodiment, since the bypass line 25 that bypasses the inlet-side filter 24 is provided in the cooling circuit 2 of the electric motor 1, even when the inlet-side filter 24 is clogged, the cooling oil can circulate in the electric motor 1 by passing through the bypass line 25. Accordingly, the electric motor 1 can be reliably cooled, and therefore the electric motor 1 can be prevented from being damaged due to its increased temperature.

Further, since the bearing-cooling line 23 is provided in the housing 6 of the electric motor 1, the cooling fluid in the bearing-cooling line 23 is not affected by the rotation of the rotor 8. Thus, the flow rate of the cooling oil sent to the bearing 7 does not fluctuate due to the rotation of the rotor 8, so that the flow rate of the cooling oil to the bearing 7 can be facilitated.

Furthermore, after being branched from the circulation line 22 into the branch line 636, the cooling fluid in the bearing-cooling line 23 flows down through the bearing-direction line 637 and the bearing-direction line 623 so as to flow out to the outer ring portion of the bearing 7. That is, the cooling fluid in the bearing-cooling line 23 smoothly flows to the bearing 7 without generating a large resistance. Accordingly, it is possible to reliably cool the bearing 7.

Further, the cooling oil having cooled the bearing 7 flows down toward the bottom 65 while cooling the rotor core 82 disposed below the bearing 7, the permanent magnetics (not shown) of the rotor core 82, the stator core 91, the stator coil 92, etc. Therefore, the cooling oil can be efficiently used.

Furthermore, since the bearing-cooling line 23 is branched from the circulation line 22 in the housing 6, there is no need to provide a branch circuit for cooling the bearing 7 outside the electric motor 1. Accordingly, the number of components of the cooling circuit 2 can be reduced and the configuration of the cooling circuit 2 can be simplified, so that the manufacturing cost of the cooling circuit 2 can be reduced.

It should be understood that the scope of the invention is not limited to the above-described exemplary embodiment but includes modifications and improvements as long as the modifications and improvements are compatible with the invention.

For instance, though the bypass line 25 and the relief valve 26 are provided in the cooling circuit 2 in the above exemplary embodiment, the advantageous effects of the present invention can be obtained without providing the bypass line 25 or the relief valve 26. Also, though the cooling circuit uses cooling oil in the above exemplary embodiment, the cooling circuit may alternatively use, for example, cooling water.

In the above exemplary embodiment, the bypass line 25 and the relief valve 26 are provided only for the inlet-side filter 24. However, a second bypass line and a second relief valve for the outlet-side filter 28 may also be provided. Alternatively, only a bypass line and a relief valve for the outlet-side filter 28 may also be provided. In this case, even if the outlet-side filter 28 is clogged, cooling oil can bypass the outlet-side filter 28 so as to cool the electric motor 1.

In the above exemplary embodiment, two filters, namely, the inlet-side filter 24 and the outlet-side filter 28 are provided. However, only one of the filters may be provided, and a bypass line and a relief valve for that filter may be provided.

In the above exemplary embodiments, the ceiling 62, the cooling-fluid introduction part 63, and the cooling-fluid introduction part 63 of the housing 6 are separately provided from each other; the bearing-direction lines 623 and 637 are separately provided from each other as the bearing-direction line 637 of the cooling-fluid introduction part 63 and the bearing-direction lines 623 of the ceiling 62; and the connection lines 635 and 641 are separately provided as the connection line 635 of the cooling-fluid introduction part 63 and the connection line 641 of the support member 64. However, these elements do not have to be provided separately from each other. Specifically, as long as the bearing-direction lines 623 and 637 extend to the bearing 7 and as long as the connection lines 635 and 641 communicate with the axial line 811 of the rotor shaft 81, for example, the bearing-direction lines 623 and 637 and the connection lines 635 and 641 may be formed as continuous single lines in the housing 6 that includes the ceiling 62, the cooling-fluid introduction part 63, and the cooling-fluid introduction part 63 which are integrally molded.

In the above exemplary embodiment, though the bearing-cooling line 23 is branched from the circulation line 22 in the housing 6, the bearing-cooling line 23 may alternatively be branched from the circulation line 22 outside the housing 6, or the bearing-cooling line 23 may be provided independently from the circulation line 22. Specifically, a cooling-oil outlet port dedicated to the bearing-cooling line 23 may be provided in the housing 6, and the bearing-cooling line 23 may be configured to extend from this dedicated cooling-oil outlet port to the bearing 7. Then, a line branched from the circulation line 22 outside the housing 6 or another circulation line provided independently from the circulation line 22 may be connected to the dedicated cooling-oil outlet port.

In the above exemplary embodiment, the cooling circuit is used for the electric motor 1 that drives the upper rotary body of the excavator. However, the invention may be embodied otherwise. The cooling circuit according to the invention may be used for various types of electric motors for various purposes. For example, the cooling circuit may be used for the generator motor connected to the output shaft 5A of the engine 5 of the excavator, or electric motors for machines other than construction machines.

In the above exemplary embodiment, a hydraulic pump 3 is connected to the output shaft 5A of the engine 5 so as to be driven by the engine 5. However, a pump for supplying cooling fluid is not limited to the hydraulic pump 3. Specifically, any pump that can supply cooling fluid (e.g. electric pump) may be used.

The invention claimed is:

1. A cooling circuit for an electric motor for a construction machine, the cooling circuit comprising:
   a circulation line that includes a shaft-side line disposed in a rotor shaft of the electric motor;
   a pump that supplies cooling fluid to the circulation line;
   a first filter disposed between the pump and the shaft-side line in the circulation line;
   a first bypass line that bypasses the first filter so as to connect an upstream side and a downstream side of the first filter; and
   a first relief valve disposed in the first bypass line.

2. The cooling circuit for an electric motor for a construction machine according to claim 1,
   wherein the first filter, the first bypass line and the first relief valve are provided within the electric motor.

3. The cooling circuit for an electric motor for a construction machine according to claim 1,
   wherein, in the electric motor, the circulation line comprises:
      a cooling fluid inlet port through which the cooling fluid is introduced;
      a port communication line that communicates with the cooling fluid inlet port;
      a filter line that accommodates the first filter and communicates with the port communication line; and
      a connection line that connects the filter line to the shaft-side line; and
   wherein the cooling fluid inlet port, the port communication line, the filter line, the first filter, the first bypass line, and the first relief valve are disposed in a same plane in the electric motor.

4. The cooling circuit for an electric motor for a construction machine according to claim 1,
   wherein the first filter is disposed upstream of the shaft-side line in the circulation line; and
   wherein a second filter having a greater capacity than the first filter is disposed downstream of the shaft-side line in the circulation line.

5. The cooling circuit for an electric motor for a construction machine according to claim 4, the cooling circuit further comprising:
   a second bypass line that bypasses the second filter so as to connect an upstream side and a downstream side of the second filter; and
   a second relief valve disposed in the second bypass line.

6. The cooling circuit for an electric motor for a construction machine according to claim 1, the cooling circuit further comprising:
   a bearing-cooling line that is disposed separately from the shaft-side line in the circulation line and is configured to cool a bearing of the rotor shaft.

7. The cooling circuit for an electric motor for a construction machine according to claim 6,
   wherein the bearing-cooling line is disposed in the electric motor and branches from a location other than the shaft-side line.

8. The cooling circuit for an electric motor for a construction machine according to claim 6,
   wherein the electric motor is mounted on the construction machine such that the rotor shaft extends vertically; and
   wherein the cooling fluid in the bearing-cooling line cools, after cooling the bearing, at least one of a rotor of the electric motor and a permanent magnet provided in the rotor before returning to the pump.

9. An electric motor that rotates an upper rotary body of a construction machine, comprising:
   a rotor shaft that is supported at opposite ends thereof by bearings, the electric motor being mounted on the construction machine such that the rotor shaft vertically extends; and
   a cooling circuit for cooling the electric motor, the cooling circuit comprising:
      a cooling fluid inlet port through which the cooling fluid is introduced;
      a port communication line that communicates with the cooling fluid inlet port;
      a filter line that accommodates a filter and communicates with the port communication line, the filter being configured to filter the cooling fluid;
      a shaft-side line disposed in the rotor shaft;
      a connection line that is disposed directly above the rotor shaft and extends in an axial direction of the rotor shaft so as to connect the filter line to the shaft-side line;
      a bypass line that bypasses the filter so as to connect an upstream side and a downstream side of the filter; and
      a relief valve disposed in the bypass line, and wherein the cooling fluid inlet port, the port communication line, the filter line, the filter, the bypass line, and the relief valve are disposed within the electric motor.

10. An electric motor that rotates an upper rotary body of a construction machine, comprising:
   a rotor shaft that is supported at opposite ends thereof by bearings, the electric motor being mounted on the construction machine such that the rotor shaft vertically extends; and
   a cooling circuit for cooling the electric motor, the cooling circuit comprising:
      a cooling fluid inlet port through which the cooling fluid is introduced;
      a port communication line that communicates with the cooling fluid inlet port;
      a filter line that accommodates a filter and communicates with the port communication line, the filter being configured to filter the cooling fluid;
      a shaft-side line disposed in the rotor shaft;
      a connection line that is disposed directly above the rotor shaft and extends in an axial direction of the rotor shaft so as to connect the filter line to the shaft-side line;
      a bypass line that bypasses the filter so as to connect an upstream side and a downstream side of the filter; and
      a relief valve disposed in the bypass line, and
   wherein the cooling fluid inlet port, the port communication line, the filter line, the filter, the bypass line, and the relief valve are disposed in a same plane in the electric motor.

* * * * *